United States Patent
Fukaya et al.

[19]

[11] Patent Number: 6,108,604
[45] Date of Patent: Aug. 22, 2000

[54] VEHICULAR NAVIGATION SYSTEM AND STORAGE MEDIUM

[75] Inventors: Takaharu Fukaya; Koji Inoue; Shinichi Kato, all of Anjo, Japan

[73] Assignee: Aisin AW Co., Ltd., Japan

[21] Appl. No.: 09/131,325

[22] Filed: Aug. 7, 1998

[30] Foreign Application Priority Data

Aug. 8, 1997 [JP] Japan .................................. 9-227262

[51] Int. Cl.[7] .............................................. G06F 165/00
[52] U.S. Cl. .................... 701/211; 701/203; 701/209; 340/995
[58] Field of Search .................................. 701/201, 202, 701/203, 208, 209, 210, 211; 340/970, 995

[56] References Cited

U.S. PATENT DOCUMENTS 5,729,109  3/1998  Kaneko et al. ..................... 318/587
5,982,301  11/1999  Ohata et al. ....................... 340/995

*Primary Examiner*—Tang Nguyen
*Attorney, Agent, or Firm*—Lorusso & Loud

[57] ABSTRACT

A vehicular navigation system includes guide control facilities which acquires stored information of an angle between a road entering and a road departing a rotary branch on a route stored in route information storing means, the angle of a junction to the rotary, and information of the changing angles of individual links forming the rotary. Direction guidance is performed on the basis of this acquired information along with the present position of a vehicle, a destination, and a computed route.

10 Claims, 14 Drawing Sheets

FIG. 3A

ROAD ATTRIBUTE DATA

| | | |
|---|---|---|
| OVERPASS /UNDERGROUND DATA | OVERPASS | ○ |
| | ADJACENT TO OVERPASS | |
| | UNDERGROUND | |
| | ADJACENT TO UNDERGROUND | |
| NUMBER OF LANES | THREE LANES OR MORE | |
| | TWO LANES | ○ |
| | ONE LANES | |
| | NO CENTERLINE | |
| BRANCH DATA | YES OR NO | 0 |
| RAMP DATA | YES OR NO | 0 |
| ROTARY DATA | YES OR NO | 1 |

FIG. 3B

ROAD NAME DATA

| ROAD CLASSIFICATION | | CLASSIFICATION NUMBER |
|---|---|---|
| EXPRESS WAY | MAIN ROAD | 1 |
| | JUNCTION | 2 |
| EXPRESSWAY (INTERCITY) | MAIN ROAD | 3 |
| | JUNCTION | 4 |
| TOLL ROAD | MAIN ROAD | 5 |
| | JUNCTION | 6 |
| PUBLIC ROAD | NATIONAL ROAD | 7 |
| | PREFECTURAL ROAD | 8 |
| | OTHERS | 9 |

FIG. 4A

CAUTION DATA

| RAILROAD CROSSING | ◯ |
|---|---|
| TUNNEL ENTRANCE | |
| TUNNEL EXIT | |
| WIDTH REDUCING POINT | |
| NONE | |

FIG. 4B

TRAVEL GUIDANCE DATA

| TOWARD RIGHT | |
|---|---|
| TOWARD LEFT | |
| TOWARD CENTER | ◯ |
| NONE | |

FIG. 5

INTERSECTION DATA

| | NUMBER (k) OF INTERSECTIONS |
|---|---|
| 1 | INTERSECTION NO. |
| | INTERSECTION NAME |
| | SIGNAL DATA |
| | PEDESTRIAN CROSSING DATA |
| | BRANCH FEATURING DATA |
| | ADMISSION ROAD DATA |
| | NON-ADMISSION ROAD DATA |
| | LANDMARK DATA |
| | ⋮ |
| k | INTERSECTION NO. |
| | ⋮ |
| | LANDMARK DATA |

FIG. 6

GUIDE PHRASE DATA

| PHRASE KIND | PHRASE CONTENT |
|---|---|
| A. DISTANCE PHRASE | 1  ABOUT 700M<br>2  ABOUT 300M<br>3  SOON<br>4  AHEAD<br>5  JUST AHEAD<br>... ... ... ... ... ... ... ... |
| B. DIRECTION PHRASE | 1  GO STRAIGHT<br>2  TURN TO THE RIGHT<br>3  TURN TO THE LEFT<br>4  SLIGHTLY RIGHTWARD<br>5  SLIGHTLY LEFTWARD<br>6  TURN RIGHTWARD<br>7  TURN LEFTWARD<br>8  FOLLOW THE ROAD<br>9  FOLLOW THE ROAD RIGHTWARD<br>10  FOLLOW THE ROAD LEFTWARD<br>11  FORK<br>12  TURN TO THE RIGHT SHARPLY<br>13  TURN TO THE LEFT SHARPLY<br>14  ENTRANCE<br>15  EXIT<br>... ... ... ... ... ... ... ... |
| C. FEATURE PHRASE | 1  NO-SIGNAL INTERSECTION<br>2  AT THE NEXT SIGNAL<br>3  AT THE SECOND SIGNAL<br>4  AT THE INTERSECTION THIS SIDE OF SIGNAL<br>5  AT THE INTERSECTION NEXT THE SIGNAL<br>6  AT THE NEXT GAS STATION<br>... ... ... ... ... ... ... ... |
| ⋮ | ⋮ |

FIG. 7A
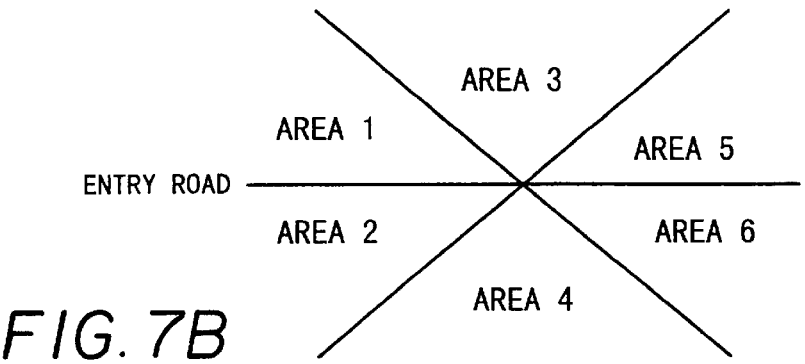
FIG. 7B
| AREA | DIRECTION GUIDE PHRASE |
|---|---|
| 1 | SHARP LEFT TURN |
| 2 | SHARP RIGHT TURN |
| 3 | LEFT TURN |
| 4 | RIGHT TURN |
| 5 | BEAR LEFT |
| 6 | BEAR RIGHT |
FIG. 8
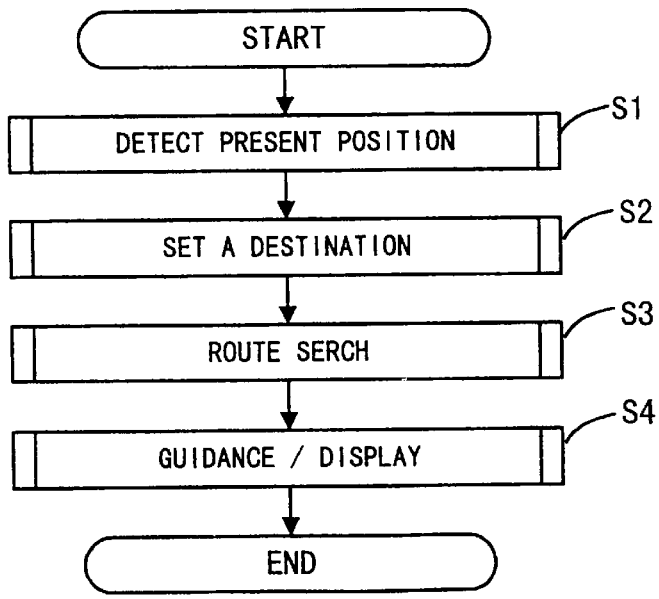

(a)

(b)

VEHICULAR NAVIGATION SYSTEM AND STORAGE MEDIUM

BACKGROUND OF THE INVENTION

1. Field of the Invention

The present invention relates to a vehicular navigation system for guidance at a road branch point, and a storage medium containing a computer program for the same.

2. Related Art

In the prior art, there have been proposed a variety of route guidance systems for ensuring a smooth run on an unfamiliar route. Route guidance systems are enabled by inputting a destination after which a route is computed and guidance is provided along roads to be followed to the destination. If there is a rotary on the route, the route guidance system directs the driver by a direction to be taken by the exit road from the rotary relative to the entrance road to the rotary.

However, these directions are sometimes difficult or confusing to follow since the position of the exit from the rotary can be different from the direction of the exit road relative to the entrance road to the rotary. It is even more difficult to follow directions for a U-turn.

SUMMARY OF THE INVENTION

The invention has been conceived to solve the above-specified problems and has an object to provide a vehicular navigation system capable of providing understandable and accurate direction guidance when a rotary branch is on the route.

According to the invention, there is provided a vehicular navigation system including rotary information such as an entering junction angle and angles of individual links between junctions forming the rotary in addition to the direction of an exit road relative to an entrance road to the rotary. The vehicular navigation system detects the present position of the vehicle; inputs information necessary for computing a route from information storage media containing area road information along with direction information for guidance along roads emanating from guide branch points including direction guide phrase data; computes the route on the basis of the information input by said input means; stores the computed route in a temporary route information storage; and outputs information for route guidance including direction guidance for approaching guide branch points including rotary junctions on the basis of the computed route and the present position detected by said present position detecting means and the rotary information.

Additionally with respect to a rotary, the system determines on the basis of the names of roads entering and departing rotary branch along with the road states before and after the junctions of the roads whether or not a turn is a U-turn.

Further a U-turn is determined under a condition that the numbers of the roads entering and departing the rotary branch have plus and minus signs when the entry road and the departure road carry facing traffic.

A U-turn of one-way is decided under conditions that the roads entering and departing the rotary branch have an angular difference within a predetermined range and have identical names, that the roads before and after the rotary are in the facing traffic and have equal numbers, and that the roads before and after the rotary are one-way and adjacent to each other.

A straight run is determined under conditions that the absolute value of an angular difference between the roads entering and departing the rotary branch is within a first predetermined value, or that the absolute value of the angular difference between the entry road and the departure road is larger than the first predetermined value and within a second predetermined value, and that the absolute value of the angular difference of a road junction is within a third predetermined value.

Right and left are decided from the angular displacement of a road from the entry road to the departure road.

According to a further aspect of the invention, there is provided a storage medium having programs packaged therein for searching a route to a destination from a starting place to a present place and for guiding along the searched route, comprising programs for searching a guide branch point on the route; acquiring information on the angle made between the roads entering and departing the rotary branch on the route, and the junction, and the information on the changing angles of individual links making the rotary; and outputting direction guide information on the basis of the acquired information of the rotary branch.

Programs stored on storage media determine on the basis of the names of roads entering and departing the rotary branch and the road states before and after the junctions of the roads whether or not a turn is a U-turn.

Additionally, the storage medium further comprises: programs for deciding a straight run under conditions that the absolute value of an angular difference between the roads entering and departing the rotary branch is within a first predetermined value, or that the absolute value of the angular difference between the entry road and the departure road is larger than the first predetermined value and within a second predetermined value, and that the absolute value of the angle difference of a road junction is within a third predetermined value.

Further the storage medium further comprises: programs for deciding right and left from the angular displacement of a road from the entry road to the departure road.

The determination of a U-turn and right and left turns can be highly accurately performed to make the direction guidance by determining the direction from information on the angle between the junction, names of the roads entering and departing the rotary, the changing angle of links composing the rotary, and roads before and after the entry road and the departure road.

BRIEF DESCRIPTION OF THE DRAWINGS

FIGS. 3A and 3B are diagrams showing examples of construction of additional data files used in the system of FIG. 1;

FIGS. 4A and 4B are diagrams showing examples of construction of still further data files used in the system of FIG. 1;

FIG. 5 is a diagram showing an example of intersection file data used in the system of FIG. 1;

FIG. 6 is a diagram showing an example of guide phrase file data used in the system of FIG. 1;

FIG. 7A is a diagram for explaining enumerated road exiting areas of a guide intersection FIG. 7B is a file table of direction guide phrases for directing a driver to exit roads in the exit areas of FIG. 7A;

FIG. 8 is a flow chart of the entire route guidance procedure or program of the system;

DESCRIPTION OF THE PREFERRED EMBODIMENTS

Figure 1:
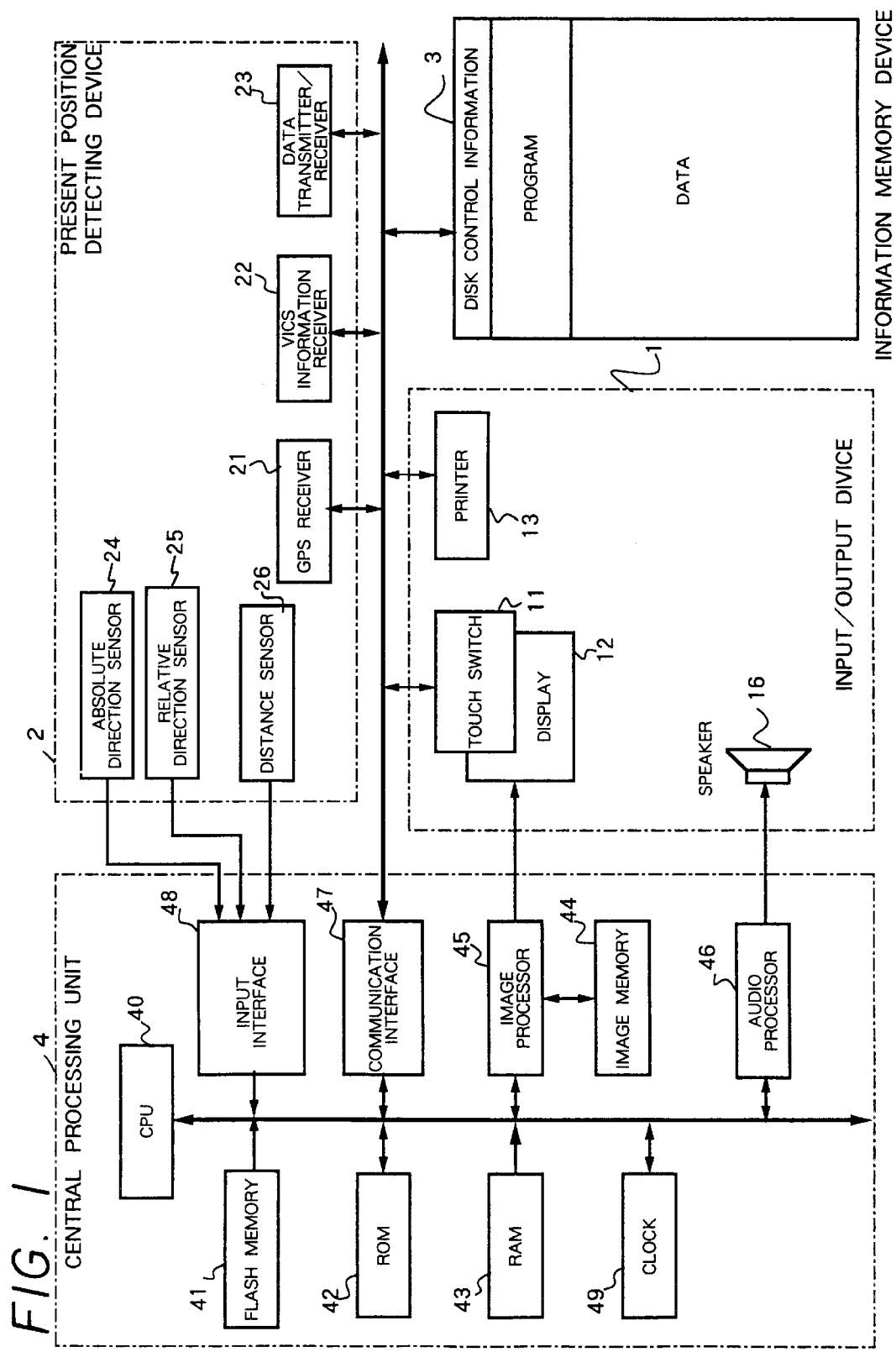
FIG. 1 is a block diagram of a navigation system according to one embodiment of the invention.

An embodiment of the invention is described with reference to the accompanying drawings wherein a navigation system, as shown in FIG. 1, includes: an input/output unit 1 for inputting/outputting information of a route guide; a present position detecting unit 2 for detecting information on the present position of a vehicle; an information storing unit 3 containing stored navigation data necessary for computing a route, display/voice guidance data necessary for the route guidance, programs (application and/or OS), and so on; and a central processing unit 4 for controlling the entire system including processing a route search and the display and guidance necessary for the route guidance.

The input/output unit 1 inputs a destination, instructs the central processing unit 4 to execute the navigation processing according to the will of a driver, so as to output the guidance information, if needed by the driver, by a voice and/or through a display screen, and outputs processed data to be printed. As the means for realizing these functions, the input portion is equipped with a touch switch 11 or a control switch for inputting the destination through a telephone number or coordinates on a map and for requesting route guidance. The input portion can naturally be exemplified by an input unit such as a remote control. On the other hand, the output portion is equipped with a display 12 for displaying the input data on the screen or the route guidance information automatically on the screen in response to a request by the driver; a printer 13 for printing the data processed by the central processing unit 4 or the data stored in the information storing unit 3; and a speaker 16 for outputting voice or audio route guidance information.

The system can include a voice recognition unit for enabling voice input or a card reading unit for reading out data recorded in an IC card or a magnetic card. There can be further added a data communication unit for exchanging data with an information source such as an information center having data necessary for navigation for providing information via communication lines in response to a demand of the driver or a notebook type electronic unit stored in advance with data specific to the driver such as map data or destination data.

The display 12 is a color CRT or a color liquid crystal display for outputting all the screens in a color display that are necessary for the navigation such as a route setting screen, a section map screen or an intersection map screen, as based on the map data or guide data processed by the central processing unit 4, and for displaying such buttons in the main screen as to set the route guide, to guide that the route is being guided, and to switch the screen. Especially, information of an intersection being approached such as the name of the intersection is popped up any time in colors on the screen.

This display 12 is mounted in the instrument panel near the driver's seat so that the driver is enabled to confirm the present position of the vehicle by looking at the section map and to obtain information on the route to follow. On the other hand, the display 12 is equipped with the touch switch 11 corresponding to the display of the function buttons, so that the aforementioned input operations are executed by touching the portions of the touch switch overlying the displayed buttons. The input signal generating means, composed of the buttons and the touch switch, constitutes the input portion, the detailed description of which will be omitted.

The present position detecting means 2 includes: a GPS receiver 21 for acquiring information by making use of the global positioning system (GPS) for the present position of the vehicle; a VICS information receiver 22 for acquiring information by making use of the FM multiplex broadcasting such information by electric wave beacon or optical beacon; a data transmitter/receiver 23 for communicating information interactively with an information center (such as ATIS) or another vehicle by making use of a portable telephone or a personal computer; an absolute azimuth sensor 24 for detecting the forward azimuth of the vehicle and the absolute azimuth by making use of the earth magnetism, for example; a relative direction sensor 25 for detecting the forward azimuth of the vehicle relative to its immediate past direction of movement or azimuth by making use of a steering sensor or gyro sensor, for example; and a distance sensor 26 for detecting the distance covered by the vehicle, for example, from the number of turns of the wheels. The present position detecting means 2 is a device for transmitting/receiving information on the drive of the vehicle such as the road information or the traffic information, for detecting the information on the present position of the vehicle, and for transmitting/receiving the information on the present position.

The information storing unit 3 is an external storage unit containing programs and data for the navigation and which, for example, comprises a CD-ROM. The programs include the processing program for the route search, the processing program shown in the flow charts of this embodiment, the programs for the display output control necessary for the route guidance and the voice output control necessary for the voice guidance, the data necessary for those programs, and the display information data necessary for the route guidance and the map display. The stored data includes files of map data, search data, guide data, voice guide phrase data, map matching data, destination data, registered point data, road data, genre data, landmark data and so on, and all the data necessary for the navigation system. As one of many possible alternatives the system can be of the type in which only data is stored in the CD-ROM while the programs are stored in the central processing unit, such as in ROM.

The central processing unit 4 includes: a CPU 40 for executing a variety of operations; a flash memory 41 for receiving the programs from the CD-ROM of the information storing unit 3 and storing them; a ROM 42 stored with programs (or program reading means) for checking and updating the programs of the flash memory 41; a RAM 43 for latching the searched route guide information such as the point coordinates or the road name code No. of a set destination, or the data being processed; an image memory 44 containing the image data to be used and displayed on the screen of the display; an image processor 45 for fetching the image data from the image memory 44 on the basis of the display output control signal from the CPU 40 and graphically processing the image data and outputting the image data to the display; a voice processor 46 for synthesizing and converting the voice, phrase, one sentence, a sound and so on, as read out from the information storing unit 3 on the basis of the voice output control signal from the CPU, into analog signals and for outputting the analog signals to the speaker 16; a communication interface 47 for transferring the input/output data by communications and a sensor input interface 48 for fetching the sensor signals of the present position detecting unit 2; and a clock 49 for specifying the date and time information for display or internal program or diagnostic use. Route guidance is performed by the screen display and/or the voice output. Whether or not the voice guidance is output can be selected by the driver.

Programs for updating operations may be stored in the external storage unit.

The programs according to the invention and the other programs for executing the navigation guidance may be wholly stored in the CD-ROM or the external storage medium or partially or wholly stored in the ROM 42.

The data or programs, as stored in the external storage medium, are input as external signals to and operated by the central processing unit of the navigation system body so that the various functions are performed.

In one example of the navigation system, the flash memory 41 is of a relatively large capacity for reading the programs from the CD-ROM of the external storage unit, as described hereinbefore; and the ROM 42 of a small capacity stored with the programs (or program reading means) for starting the CD-ROM reading. The flash memory 41 holds the stored information even if the power is disconnected. In short, the flash memory 41 is nonvolatile storage means. Upon starting the CD-ROM reading, moreover, the programs of the ROM 42 acting as the program reading means compare the programs as stored in the flash memory 41 with the program data on the CD-ROM, and reads the disk management information or the like of the CD-ROM of the information storing unit 3. The programs are loaded (or updated) by making decisions from that information and the state of the flash memory 41.

Figure 2:
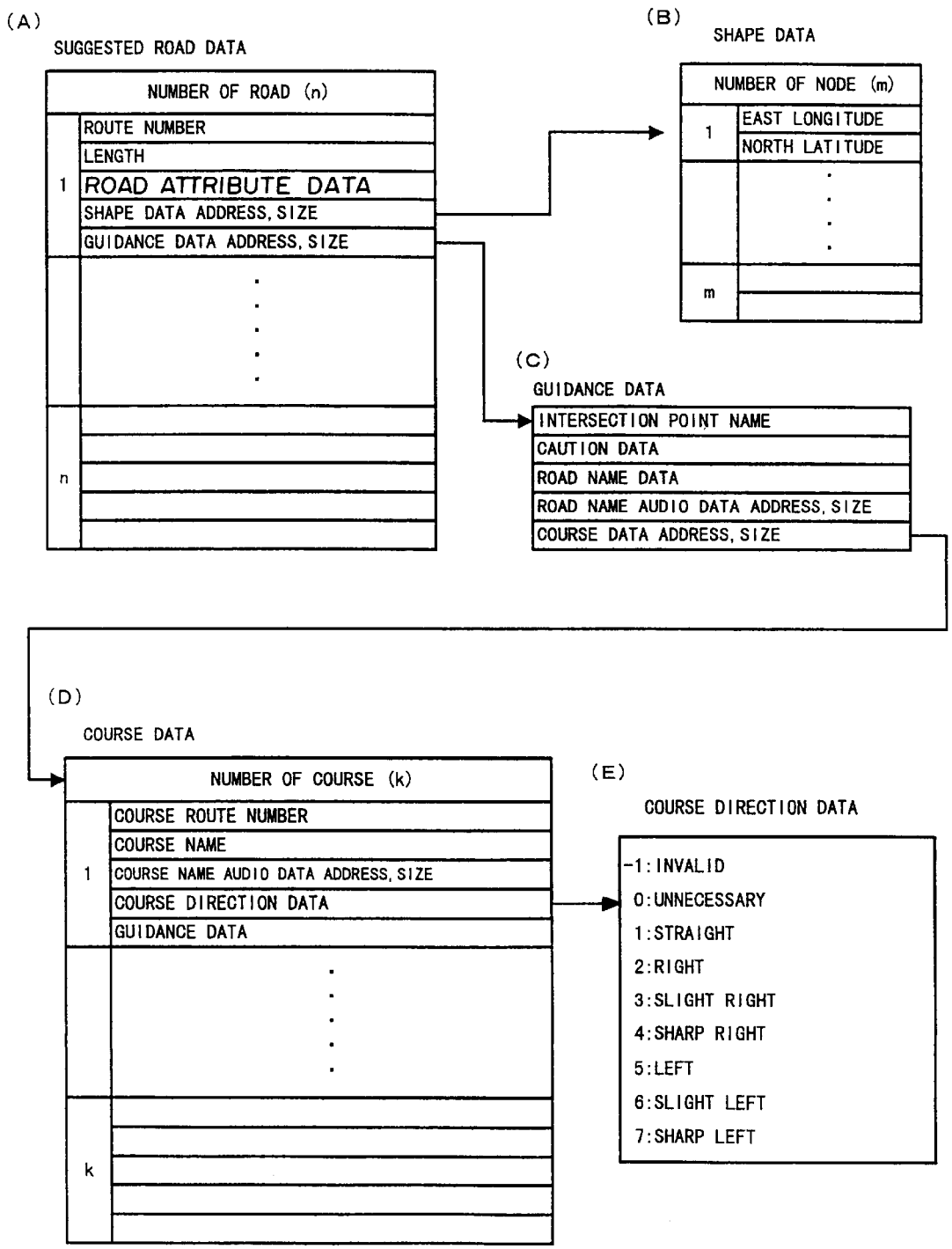
FIG. 2 is a diagram showing an example of construction of several data files suitable for use in the navigation system of FIG. 1.

FIGS. 2 to 4 show examples of the structures of essential data files stored in the information storing unit 3, as shown in FIG. 1. FIG. 2 includes a guide road data file (A) which is stored with the data necessary for computing the route by route computing means to perform the route guidance. For each road number n, the guide road data file includes individual data of a road or route number, a length, road attribute data, the address and size of shape data, and the address and size of the guidance data. A road number is set for each road between branch points and in each direction (to and from the destination). The road attribute data for each road as the road guidance aiding information data, as shown in FIG. 3(A), is exemplified by whether or not the road is an overpass, an adjacent roadway of an overpass, an underground road, or an adjacent roadway of an underground road along with information of the number of lanes, branch data (or a flag indicating whether or not there is associated branch data), ramp data (or a flag indicating whether or not there is associated ramp data) and rotary data (or a flag indicating whether or not there is rotary data).

The aforementioned shape data is exemplified, as shown at (B) in FIG. 2, by coordinate data including longitude and latitude for each node (m) of a plurality of nodes for each road number (n).

The aforementioned guidance data is exemplified, as shown at (C) in FIG. 2, by individual data such as the name of an intersection (or a branch point), caution data, road name data, the address and size of road name voice data, and the address and size of course data. The caution data is exemplified, as shown in FIG. 4A, by information indicating whether or not the guidance point includes a railroad crossing, a tunnel entrance or exit, a width reducing point, or no caution; the caution data is used for cautioning the driver about a railroad crossing, a tunnel, road narrowing point, or some other condition at a guidance point other than a branch point. The aforementioned road name data is exemplified, as shown in FIG. 3B, by information on the kind of a road such as a expressway, a city expressway, a toll road, an ordinary road (e.g., national, prefectural or other road), and the information indicating whether the road such as the expressway, the city expressway or the toll road is a main road or a junction, and is composed of the road kind data and the kind numbers of the individual kind data for each road kind.

The aforementioned course or destination data is exemplified, as shown at (D) in FIG. 2, by the course road or route No., the course name, the address and size of the course name voice data, the course direction data, and guidance data. The course name includes the direction name. On the other hand, the course direction data is exemplified, as shown at (E) in FIG. 2, by the information of invalid (no destination direction data is used), unnecessary (requiring no guidance), straight, right, slight right, sharp right, left, slight left and sharp left. The aforementioned guidance data is exemplified, as shown in FIG. 4B, by data for guiding the vehicle to move to one of a plurality of lanes—toward right, toward left, toward center, or none.

In the data structure of FIG. 2, the information on the intersections is stored with the road data. However, the intersection data and/or additional intersection data may be stored separately from the road data, as shown in FIG. 5. Such additional data includes the information of the presence of a signal, pedestrian crossing data, branch featuring data, admission road data (road data to enter the intersection), non-admission road data (road data to leave the intersection), or landmark data. If junction data is added to the road data, however, data such as no admission from one road to another can be eliminated to reduce the amount of data.

FIG. 6 lists guide phrase data used for voice guidance. A typical guide sentence is divided into a distance phrase, a direction phrase and a feature phrase. When the guidance voice data is to be output, the individual phrases are combined to produce sentence, for example, "soon right turn" and is output as a set guide branch point approaches. In the invention, the road information is acquired for all the roads entering and departing the guide branch point, as will be described in the following. The direction phrase portion of the guidance sentence is set in advance such as "go straight", "slight right (or left) turn", "bear right", "bear left", "keep right", "keep left", "fork", "sharp right turn", and "sharp left turn". These phrase data are suitably selected according to the situations of the guide branch thereby to perform precise direction guidance.

In FIG. 7A, turn directions at an intersection or guide branch point are divided into areas 1 to 6 according to the angle that the exit road makes with a road entering the guide branch point. The areas 1 and 2 correspond to the sharp turn areas; the areas 3 and 4 correspond to the normal turn areas; and the areas 5 and 6 correspond to the bear or slight turn areas. To these areas 1 to 6, there correspond the individual direction guide phrases, as shown in the table of FIG. 7B. This table is stored in the information storing unit.

An overall processing flow of the vehicular navigation system according to the invention is described in connection with FIG. 8. When the programs of the route guidance system are started by the CPU 51 of the central processing unit 4, the present position is detected by the present position detecting unit 2 to display the peripheral map around the present position and the name and so on of the present position (at Step S1). Next, the destination is set (at Step S2) by the driver using a target or destination name such as the place name or the facility name, a telephone number, an address, a registered point, and so on, after which the program searches the route from the present position to the destination (at Step S3). When the route is determined, the route guidance/display continues (at Step S4) until the destination is reached; the present position is continuously updated by the present position detecting unit 2 during the route guidance/display. When a detour setting is input before the destination is reached, a search area is set for a re-search, and the route guidance/display continues on the re-searched route until the destination is reached.

In the route guidance/display of the aforementioned Step S4, according to the invention, route guidance at any rotary branch on the route is accurately performed.

Figure 9:
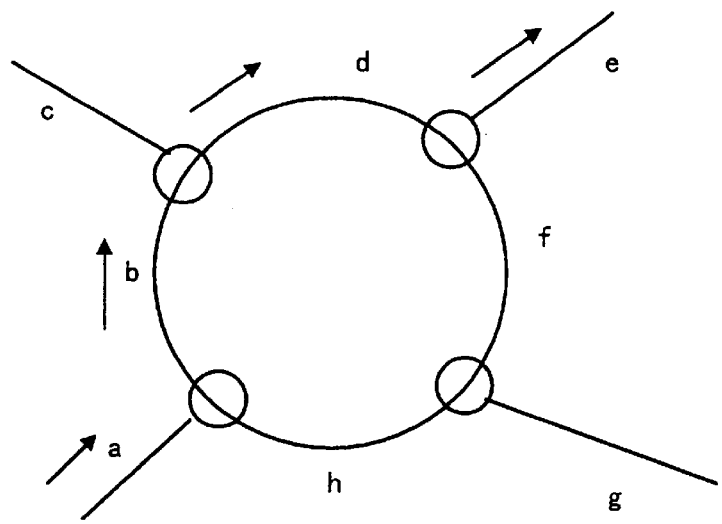
FIG. 9 is a diagram explaining a road acquisition at a rotary branch.

Road information acquisition at a rotary branch is illustrated in FIG. 9 wherein the rotary is one-way in the clockwise direction for places where vehicles travel on the left side of two lane roads carrying traffic in opposite directions. The rotary can be one-way in the counter clockwise direction as is common in places where vehicles travel on the right side of two lane roads.

In the case of the rotary branch, the information on the roads to and from the rotary and any intervening road (or link) are acquired. In one method, the roads in the route data forming a rotary are identified by referring to the road attributes, as shown in FIG. 3A, and particularly to the rotary data attribute. In the rotary branch shown in FIG. 9, for example, the searched route follows a-b-d-e and the roads (or links) having the rotary attributes are b-d-f-h. The road a is an entry road because it has no rotary attribute; the road b is followed forward because it has rotary attributes; the road c is a departure road because it has no rotary attribute; and the road d is followed forward because it has rotary attributes; and the road e is a departure road because it has no rotary attribute. In the search including route a-b-d-e, it is possible to acquire the entry road a, the departure roads c and e, and the intervening roads (or links) b and d.

Figure 10A:
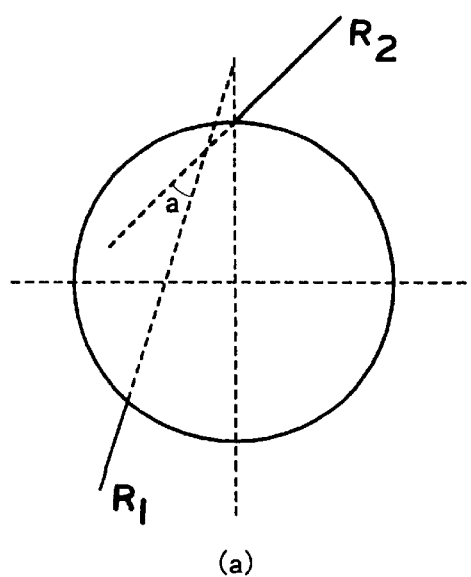
FIGS. 10A and 10B are diagrams explaining the angular difference between roads entering and exiting a rotary and the angles of a mounting position.

FIG. 10A is a diagram explaining an angular difference between the roads entering and departing the rotary. This angular difference is expressed by an angle of intersection a between the extension of an entry road $R_1$, and the extension of a departure road $R_2$.

Figure 10B:
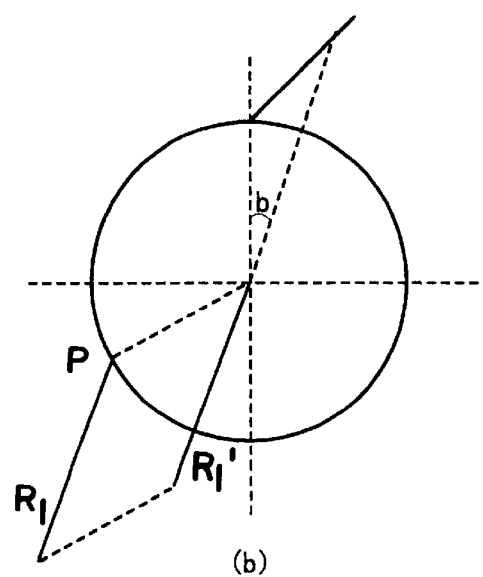

On the other hand, FIG. 10B is a diagram explaining the angle of a junction. The angle of the junction (or a point P to the rotary) of the entry road $R_1$ is expressed by an angle b, as made between a reference line passing through the center of the rotary and a road $R_1'$ where the road $R_1'$ passes through the center of the rotary and is parallel to the road $R_1$, i.e., the road $R_1$ can be said to be moved to a position parallel to itself so that the terminal point (or the position P) of the road $R_1$ is at the center of the rotary to form the road $R_1'$.

Next, the acquisition of the angular displacement from the entry road to the departure road, as used for deciding the right and left turns of the rotary, is described with reference to FIG. 11.

Figure 11:
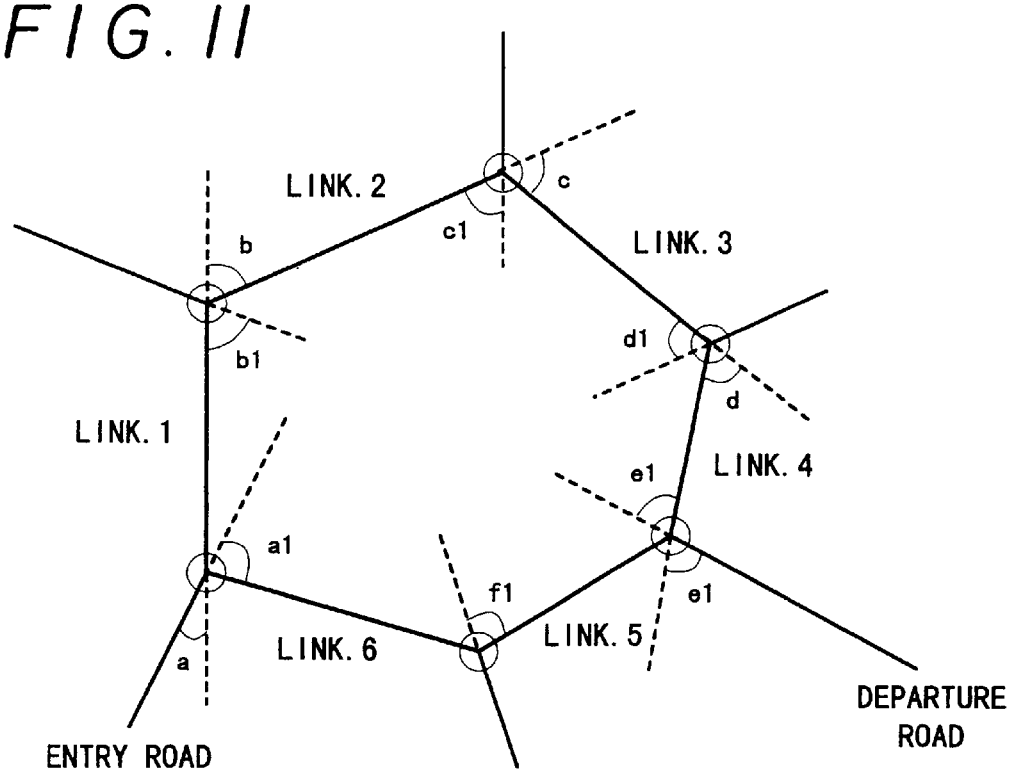
FIG. 11 is a diagram explaining angular displacements from roads entering and departing a rotary.

In FIG. 11, the rotary is composed of links 1 to 6. It is assumed that the link 1 is entered at an angle a whereas the link 4 is departed at an angle e1, and that a clockwise angle is negative whereas a counter-clockwise angle is positive. The angular displacement (or difference) of the departure road to the entry road is determined by:

Angular displacement=a-b-c-d+e1.

Figure 12:
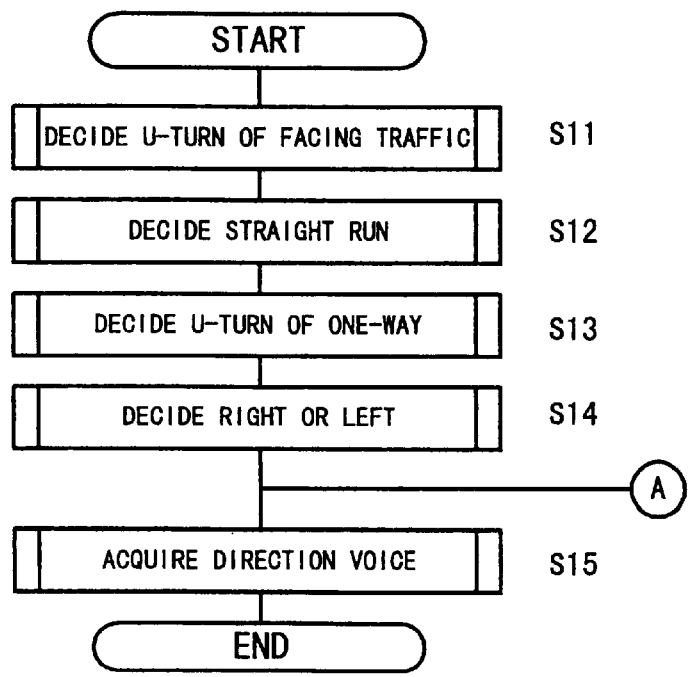
FIG. 12 is a flow chart of a routine for determining the exit direction of the rotary.
Figure 15:
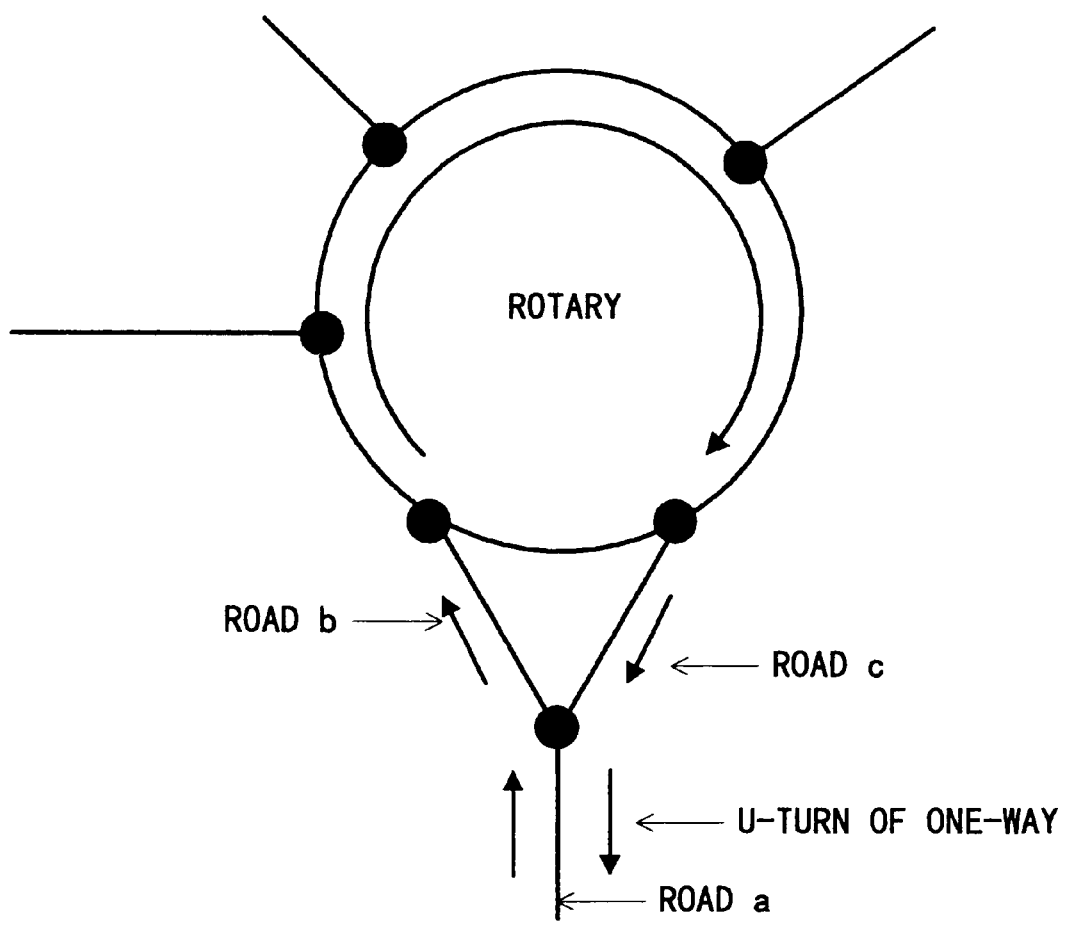
FIG. 15 is a diagram showing an example of the case of determining a U-turn of one-way run.

FIG. 12 is a flow chart explaining a processing procedure of a direction decision at a rotary. Step S11 is a U-turn determination or decision of a road with facing traffic, as processed by the procedure of FIG. 13. The U-turn determination of roadways carrying facing traffic is made by deciding whether or not the entry road and the departure road are identical. If this answer is YES, this run is decided as the U-turn. An example of the U-turn decision of the facing traffic is shown in FIG. 15 if road a is a non-divided road carrying traffic in both directions and joined directly to the rotary.

Figure 13:
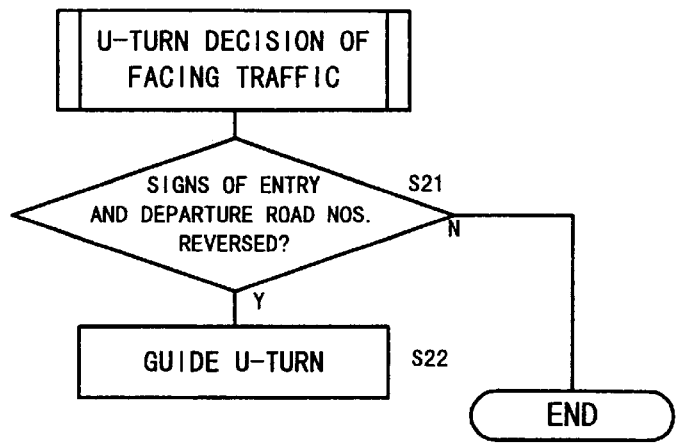
FIG. 13 is a flow chart of a routine for determining a U-turn of facing traffic.

When the entry road and the departure road are the same, the entry and departure roads have the same No. but with plus and minus signs. If the multiplication of the entry road No. by (−1) is equal to the departure road, the approaching turn is determined to be a U-turn. As shown in FIG. 13, it is decided (at Step S21) whether or not the signs of otherwise equal entry and departure road Nos. are reversed. If this answer is YES, a U-turn guidance is provided (at Step S22). Otherwise, the routine is ended.

Figure 14:
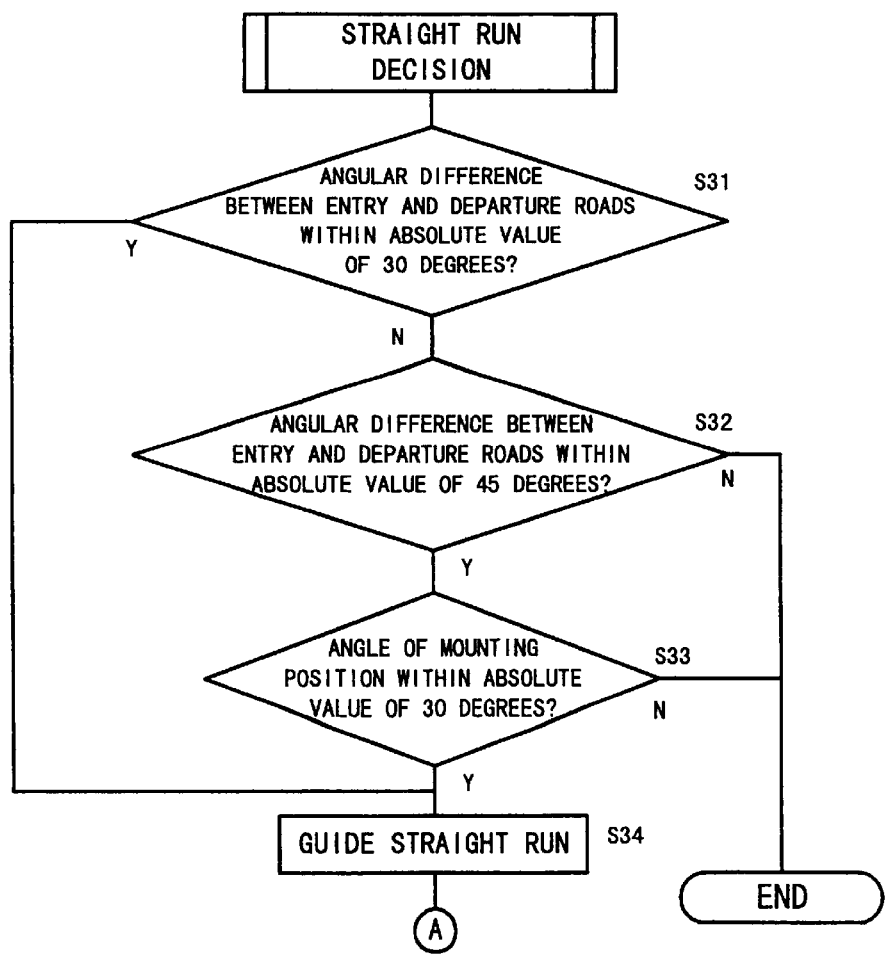
FIG. 14 is a flow chart of a routine for determining a straight run.

Step S12 is a procedure to determine if route through the approaching guidance branch point or rotary is a straight run (decision of the straight run), as processed by the procedure shown in FIG. 14.

In FIG. 14, it is decided (at Step S31) whether or not the angular difference (in an absolute value) between the entry road and the departure road is within 30 degrees. If this answer is YES, guidance for a straight run through the guidance branch point or rotary is provided (at Step S34). If the angular difference between the entry road and the departure road is larger than 30 degrees, it is decided (at Step S32) whether or not the angular difference is within 45 degrees. If this answer is YES, it is decided (at Step S33) whether or not the angle of the junction (see b in FIG. 10B) is within 30 degrees. If this answer is YES, it is decided (at Step S34) that the run is straight, and guidance for a straight run is provided. If the angle of the junction is larger than 30 degrees no matter whether the angular difference between the entry road and the departure road might be larger or smaller than 45 degrees, the routine is ended. In the rotary case, the directional feel is seriously different depending upon not only the angular difference between the entry road and the departure road but also the relative position of the junction of the rotary with the entry road and the departure road. Therefore, the straight run is decided if the angular difference between the entry road and the departure road is within 45 degrees and if the angle of the junction is within 30 degrees.

Figure 16:
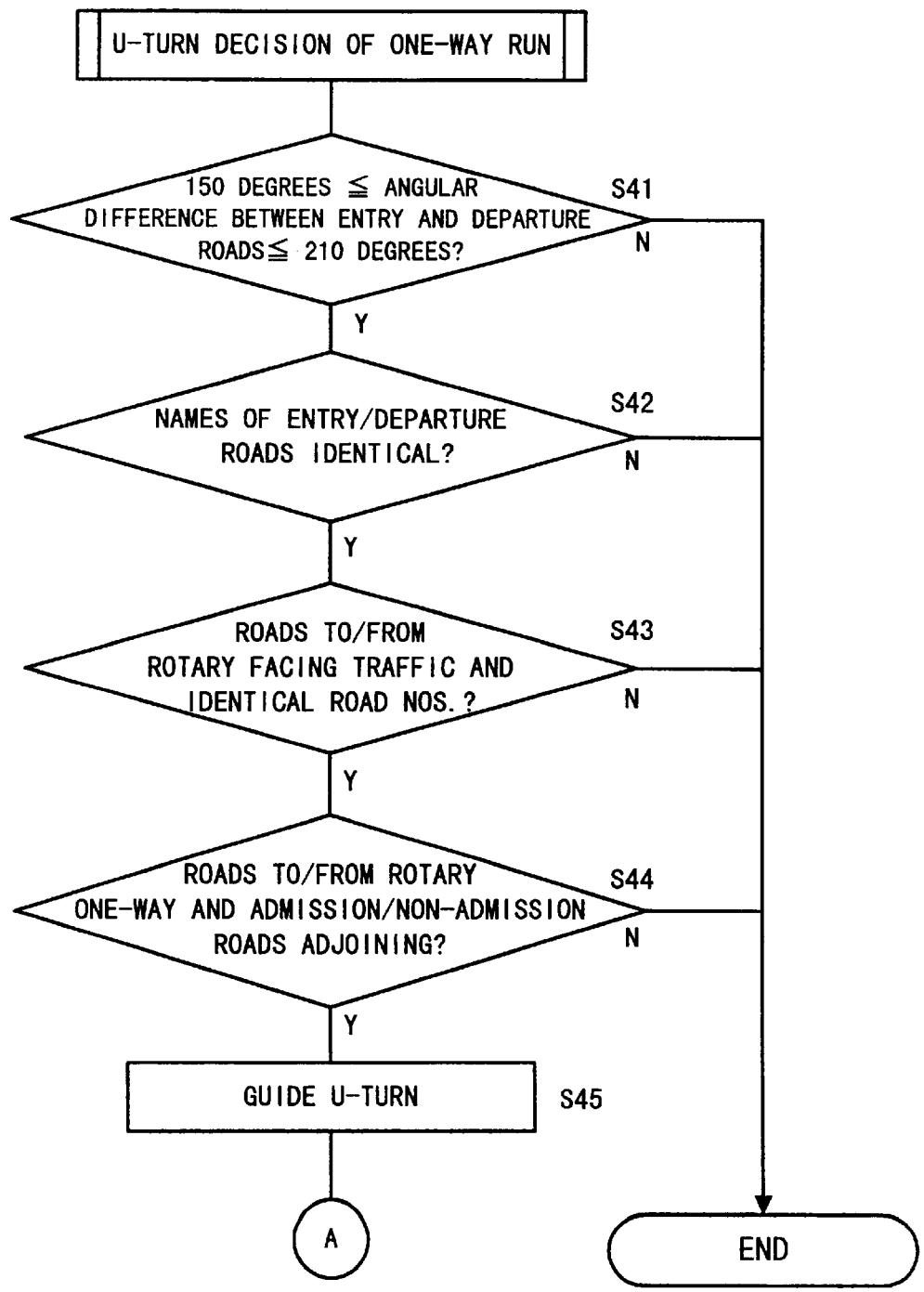
FIG. 16 is a flow chart of a routine for determining the U-turn of a one-way run.

Step S13 is a determination that a route through the approaching guidance branch point or rotary includes a U-turn on a roadway having opposite one way portions connecting the roadway to the rotary (U-turn decision of one way), as exemplified in FIG. 15, and the processing procedure is shown in FIG. 16. In FIG. 15, road a is a road carrying facing traffic, and its road Nos. have reversed signs. A rotary entry road b is connected to the road a for entering the rotary branch, and an rotary exit road c branches from the rotary and is connected to the road a. The roads b and c are one-way roads having identical names and are adjacent to each other. Here will be described the case in which the guide route is road a→road b→(clockwise) rotary→road c→road a and in which the direction guidance is provided at the road a.

In the processing procedure of FIG. 16, it is decided (at Step S41) whether or not the angular difference between the entry road (e.g., the road b of FIG. 15) and the departure road (e.g., the road c of FIG. 15) is no less than 150 degrees and no more than 210 degrees. If this answer is YES, it is decided (at Step S42) whether or not the entry road and the departure road have identical names. Since the roads b and c have identical names, it is decided (at Step S43) whether or not the roads (i.e., the road a) before and after the entry and exit roads carry traffic in opposite directions (facing traffic) and have identical road Nos. Since the road a has identical road Nos. and carries facing traffic, it is decided (at Step S44) whether or not the entry and exit roads (b, c) to and from the rotary are one-way and whether or not the entry road and the exit road are adjacent to each other. Since the roads b and c satisfy these conditions, guidance for a U-turn of one way is provided at the road a (at Step S45). If the conditions of the individual Steps S41, S42, S43 and S44 are not satisfied, the routine is ended.

A U-turn is decided if a road segment connecting a road with facing traffic to a rotary is in the form of separately digitized roads with the same road No. in the database to define an entry road and a departure road having one ends close to each other an carrying traffic in opposite directions. If either or both of the roads to and from the rotary are one-way and are not joined to a road carrying facing traffic in the guidance route, the U-turn is not decided.

Figure 17:
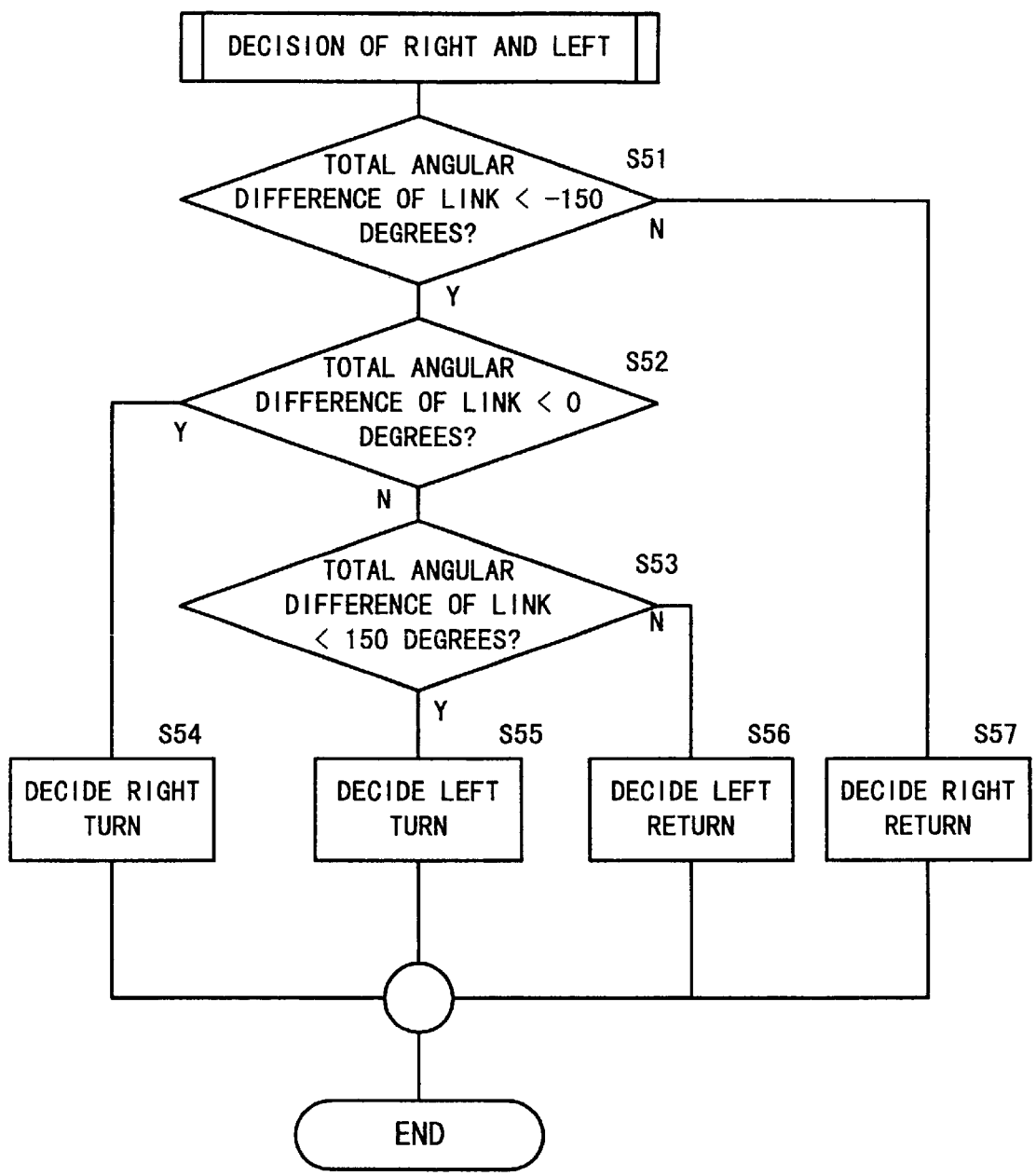
FIG. 17 is a flow chart of a routine for determining right and left turns.
Figure 18:
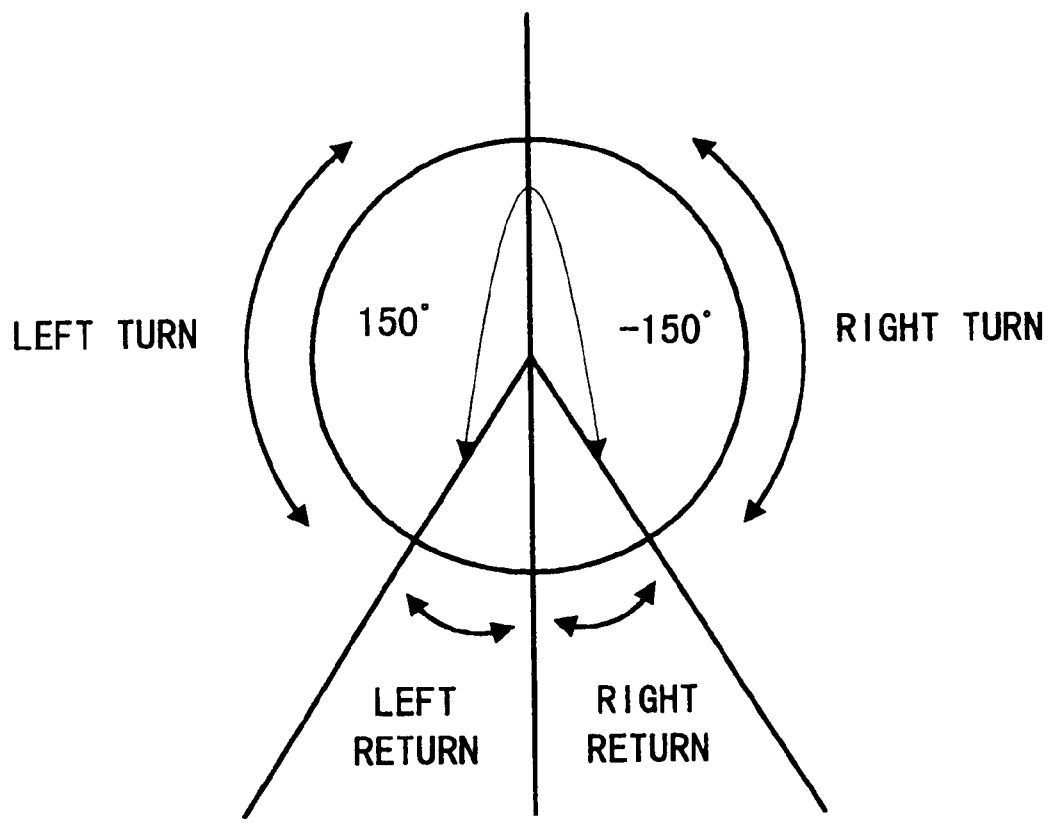
FIG. 18 is a diagram explaining the right and left turn decisions.

Step S14 is a decision of the right and left of a rotary and has a procedure shown in FIG. 17. In FIG. 17, it is decided (at Step S51) whether or not the total angular difference of the link is less than −150 degrees (as made positive in the counter-clockwise direction and negative in the clockwise direction). If the total angular difference is larger than −150 degrees, a right return (sharp right turn) is decided (at Step S57). If the total angular difference of the link is between −150 degrees and 0 degrees, a right turn is decided (at Step S54). It is decided (at Step S53) whether or not the total angular difference is not less than 0 degree (the angle is positive) and less than 150 degrees. A left return (sharp left turn) is decided (at Step S56), if the angular difference is larger than 150 degrees, whereas a left turn is decided (at Step S55) if the angular difference is smaller than 150 degrees. As a result, decisions are made, as shown in FIG. 18, to provide corresponding guidance.

The entire disclosure of Japanese Patent Application No. 9-227262 filed on Aug. 8, 1997, including specification, claims and drawings, is incorporated herein by reference.

While the invention has been described with reference to preferred embodiments, the foregoing embodiments are merely illustrative of the invention and should not be construed as limiting the invention. Various modifications and applications may be adopted by those skilled in the art without departing from the true spirit and scope of the invention as defined by the appended claims.

What is claimed is:

1. A vehicular navigation system comprising:

present position detecting means for computing the present position of a vehicle;

information storing means containing area information for guidance in a direction of a road emanating from a guide branch and data necessary for the route guidance, and including direction guide phrase data corresponding to individual areas;

input means for inputting information necessary for computing a route;

route computing means for computing the route on the basis of the information input by said input means;

route information storing means for storing the information of the route, as computed by said route computing means;

output means for outputting information for route guidance; and guidance control means for outputting the guidance information of a next guidance branch to said output means on the basis of the route, as computed by said route computing means, and the present position detected by said present position detecting means, wherein said guide control means acquires information of an angle between a road entering and a road departing a rotary branch on a route stored in said route information storing means, and a junction angle and information of changing angles of individual links forming the rotary, and outputs direction guidance information on the basis of the acquired information.

2. A vehicular navigation system according to claim 1, wherein it is decided on the basis of the names of roads entering and departing the rotary branch and the road states before and after the junctions of the roads whether or not a turn at the rotary branch is a U-turn.

3. A vehicular navigation system according to claim 2, wherein the U-turn is decided when the numbers of the roads entering and departing the rotary branch are equal but have respective plus and minus signs when the entry road and the departure road carry facing traffic.

4. A vehicular navigation system according to claim 1, wherein a U-turn of one-way is decided when entry and departure roads to and from the rotary branch have an angular difference within a predetermined range and identical names, roads connected to the entry and departure roads before and after the rotary carry facing traffic and have equal numbers, and the entry and departure roads are one-way and adjacent to each other.

5. A vehicular navigation system according to claim 1, wherein a straight run is decided when the absolute value of an angular difference between the roads entering and departing the rotary branch is within a first predetermined value, or the absolute value of the angular difference between the entry road and the departure road is larger than the first predetermined value and within a second predetermined value and the absolute value of the angle difference of a road junction is within a third predetermined value.

6. A vehicular navigation system according to claim 1, wherein right and left turns at a rotary are decided from an angular displacement including rotary links from the entry road to the departure road.

7. A storage medium having programs packaged therein for searching a route to a destination from a starting place to a present place and for providing guidance along the searched route, comprising the storage medium with further programs for:

searching a rotary guidance branch point on the route;

acquiring information on an angle made between the roads entering and departing the rotary branch on the route, information on junctions in the rotary, and information on changing angles of individual links between junctions forming the rotary; and outputting direction guidance information on the basis of the acquired information of the rotary branch.

8. A storage medium according to claim 7, wherein it is decided on the basis of the names of roads entering and departing the rotary branch and the road states before and after the junctions of the roads whether or not a turn is a U-turn.

9. A storage medium according to claim 7, further comprising:

programs for deciding a straight run when the absolute value of an angular difference between the roads entering and departing the rotary branch is within a first predetermined value, or the absolute value of the angular difference between the entry road and the departure road is larger than the first predetermined value and within a second predetermined value and the absolute value of the angle difference of a road junction is within a third predetermined value.

10. A storage medium according to claim 7, further comprising: programs for deciding right and left turns from an angular displacement including rotary links from the entry road to the departure road.

* * * * *